May 23, 1967 J. W. CARTER 3,321,216

METHOD AND APPARATUS FOR CONTROLLING BOUNCE IN TRACTOR-TRAILER COMBINATIONS

Original Filed Dec. 23, 1963 3 Sheets-Sheet 1

INVENTOR.
John W. Carter
BY
Fryer and Zimwald
ATTORNEYS

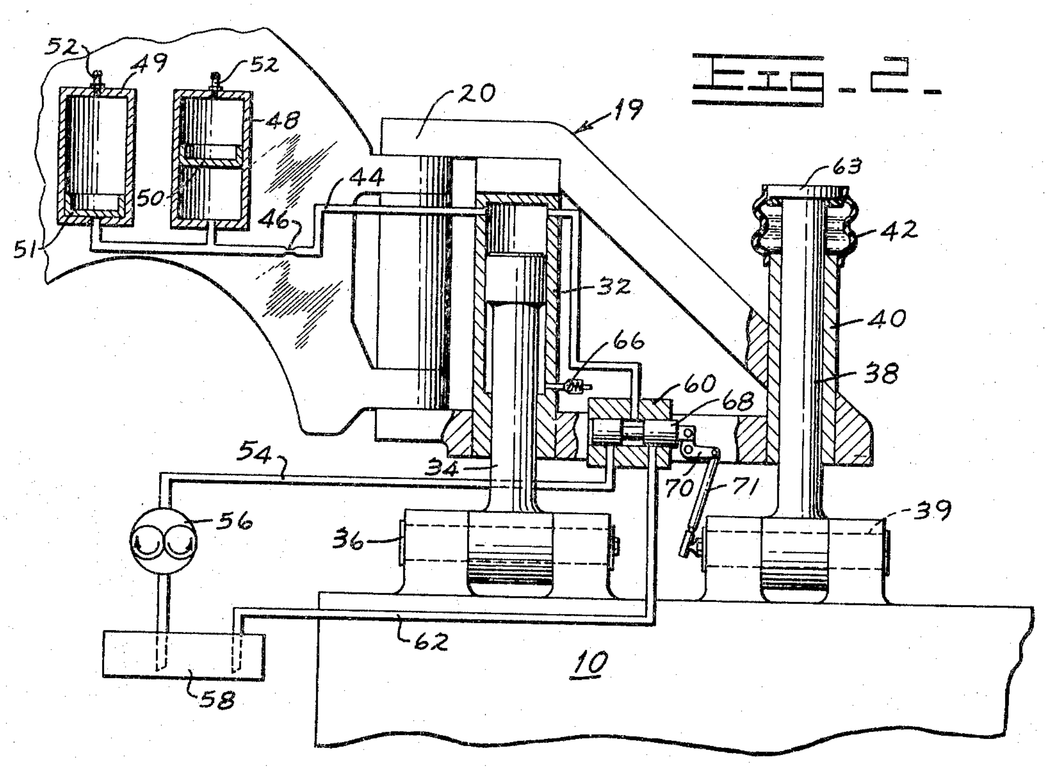
FIG. 2
FIG. 4
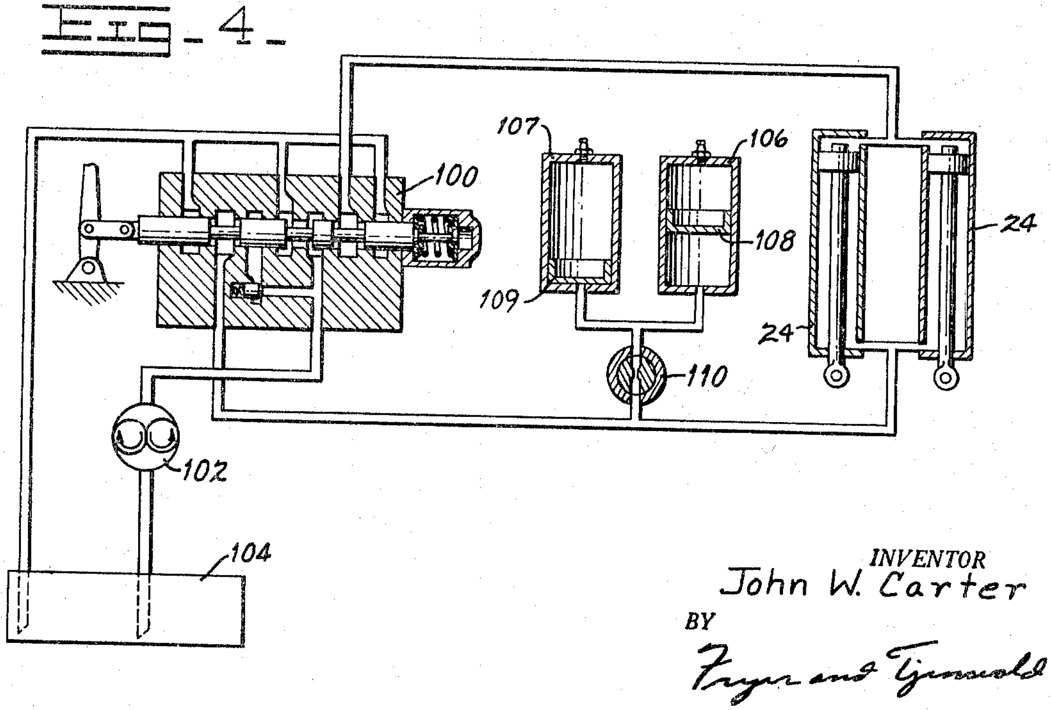
INVENTOR
John W. Carter
BY
Fryer and Tjensvold
ATTORNEYS May 23, 1967 J. W. CARTER 3,321,216

METHOD AND APPARATUS FOR CONTROLLING BOUNCE IN TRACTOR-TRAILER COMBINATIONS

Original Filed Dec. 23, 1963 3 Sheets-Sheet 3

INVENTOR
John W. Carter
BY
Fryer and Tjensvold
ATTORNEYS

United States Patent Office 3,321,216
Patented May 23, 1967

3,321,216

METHOD AND APPARATUS FOR CONTROLLING BOUNCE IN TRACTOR-TRAILER COMBINATIONS

John W. Carter, Peoria, Ill., assignor to Caterpillar Tractor Co., Peoria, Ill., a corporation of California Continuation of application Ser. No. 332,370, Dec. 23, 1963. This application Apr. 14, 1966, Ser. No. 549,102
11 Claims. (Cl. 280—489)

This application is a continuation of my prior application Ser. No. 332,370, filed Dec. 23, 1963, and now abandoned.

This invention relates to improving the riding qualities and reducing stresses in the structural components of tractor-trailer combinations and particularly to such combinations wherein the tractor is of the two-wheel type.

In some two-wheel tractor applications and particularly in a two-wheel tractor and two-wheel earthmoving scraper combination, the resiliency of the tires and the weight of the scraper suspended between the front and rear wheels of the combination during a haul at relatively high speeds create an intolerable vertical or bouncing movement. Ordinary shock or vibration absorbers are impractical as a solution to this characteristic bounce of two-wheel tractors because of the unusual size and weight of the equipment and of the loads transported by it. The Frahm principle might be applied to correct this condition by adding a secondary mass or pendulum to the apparatus to vibrate at a frequency properly related to that of the main apparatus. This would tend to oppose or cancel the vibrations of the main apparatus but the added weight of the pendulum would reduce the overall load carrying capacity of the apparatus and is, therefore, undesirable.

This theory of secondary vibration systems tuned to cancel the undesirable vibrations of a first system is embraced in the present invention, in that in accordance with the principal concept of the invention, the scraper of the tractor-scraper combination is employed as the mass of the secondary system. Instead of adding a secondary mass to a primary mass, the primary mass is split into a primary and secondary mass by properly mounting the scraper for oscillatory movement about the axis of the rear wheels of the combination. By precisely tuning the oscillatory frequency of the scraper, the tractor oscillations are effectively eliminated by opposing forces. If the scraper is not properly tuned to oscillate at the correct frequency relative to the tractor, no beneficial results can be obtained.

It is, therefore, an object of the present invention to provide a method and apparatus for a two-wheel tractor-trailer combination which permits limited vibration or oscillation of the trailer about the axis of its supporting wheels and which includes resilient means tuned to a frequency which tend to oppose or cancel the vertical vibrations or bounce of the tractor-trailer combination.

Further objects and advantages of the invention reside in more detailed improvements and in the particular construction and arrangement of its several components, all of which are made apparent in the following specification and by reference to the accompanying drawings.

In the drawings:

FIG. 2 is a schematic view in side elevation and partially in section of a tractor-trailer hitch illustrating the components of the damping and tuning mechanism of the present invention;

FIG. 4 is a schematic fluid circuit diagram of the modification shown in FIG. 3.

Figure 1:
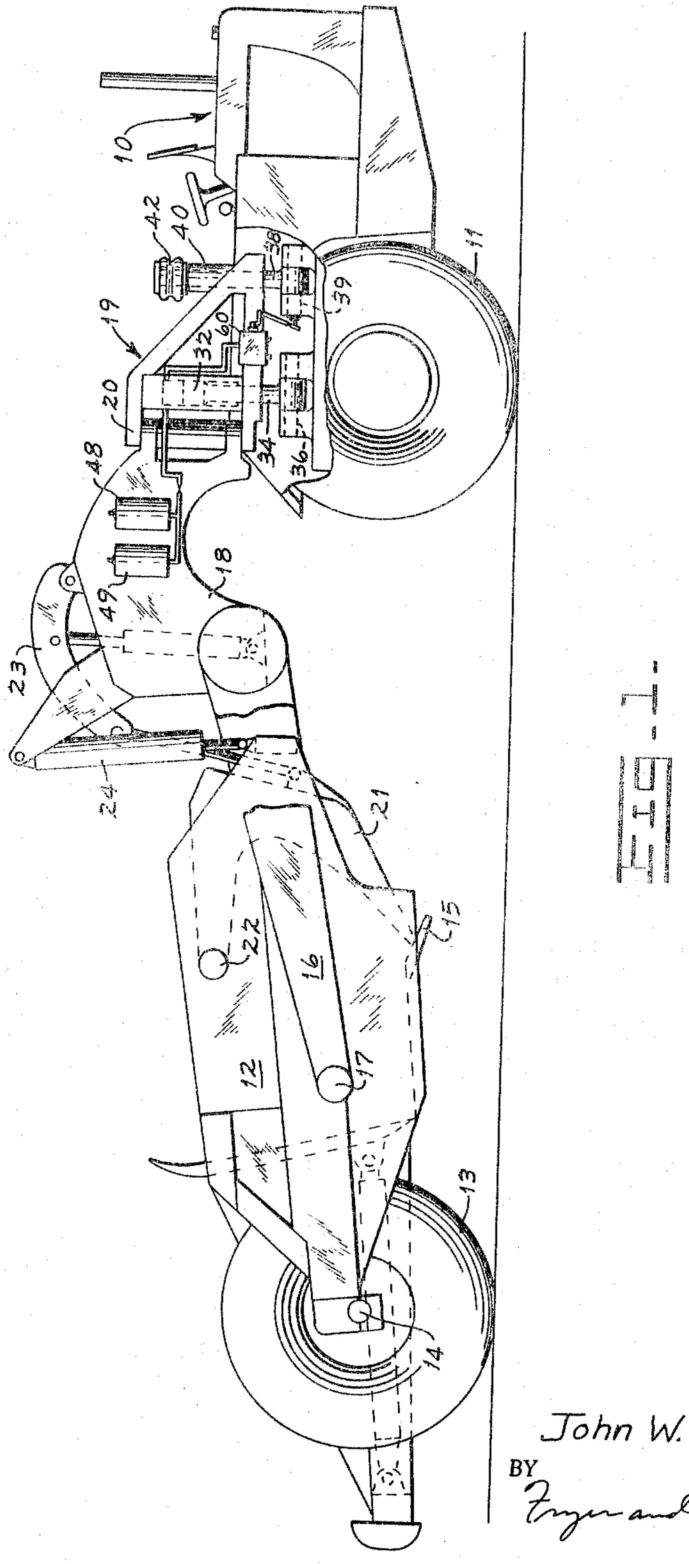
FIG. 1 is a schematic view in side elevation of a two-wheel tractor and trailer combination, the trailer being in the form of an earthmoving scraper of conventional design and illustrating the present invention applied thereto.

The principal parts of a two-wheel tractor and scraper combination are schematically illustrated in FIG. 1 of the drawings where a tractor 10 is shown as having a pair of supporting wheels, one of which is illustrated at 11. The scraper comprises a bowl 12 pivotally supported by wheels, one of which is shown at 13, so that it may be raised and lowered about an axis 14 common to the axis of the wheels and between the caryying position shown or a lower position where a cutting edge 15 engages and cuts earth to fill the bowl as the scraper moves forwardly. A draft assembly comprises spaced arms, one of which is illustrated at 16 pivoted as at 17 to opposite sides of the bowl and rigidly connected with a forwardly extending gooseneck 18 secured to the tractor through a hitch assembly generally indicated at 19 to which the draft assembly is pivotally connected as shown at 20.

A conventional apron 21 is pivoted to the sides of the bowl as at 22 and may be moved to and from a position closing the front of the bowl by means of linkage 23 and suitable power means not shown. The forward end of the bowl is raised and lowered by power means herein shown as hydraulic jacks 24 extending between a bracket on the gooseneck 18 and the forward portion of the bowl. A pair of jacks is often used for this purpose. Extension of the jack or jacks positioned as shown, lowers the bowl to its scraping position, while retraction thereof raises it to the carrying position shown and the bowl swings about the axis 14. Consequently, the entire bowl structure, including the draft connection, may be utilized as the mass of a secondary vibration system, in that it is capable of oscillating about the axis 14 and prevented from doing so only by the connection of the forward end with the tractor.

The present invention takes advantage of this pendulum-like weight and provides means to permit limited swinging or oscillation of the scraper about its supporting axis, and means for tuning this vibratory movement of the scraper to a frequency so regulated with respect to the natural frequency of the bouncing motion caused by the large rubber-tired wheels 11 and 13 as to modify or cancel out the bouncing motion of the tractor-trailer combination.

I have found that by thus utilizing the weight of the bowl structure as a secondary vibratory system, and by tuning the vibratory movement of this secondary system to an appropriate frequency (depending upon the natural frequency of the bouncing motion), the resultant motion of the trailer at such frequency automatically generates out-of-phase forces which tend to suppress bouncing motion of the tractor unit, thereby cancelling the bouncing motion of the tractor-trailer combination. Although the generation of out-of-phase forces occurs in accordance with well-known principles in dynamic vibration absorbers, my invention makes possible the incorporation and utilization thereof in the construction and operation of tractor-trailer combinations without requiring the addition of a secondary mass which would reduce the load carrying capabilities of the vehicle.

The means for accomplishing this is best illustrated in FIG. 2, where the hitch assembly 19 is provided with a single vertically disposed cylinder 32 slidably embracing a piston 34 which is pivoted as by a pin 36 and suitable brackets to the body of the tractor 10. A suitable guide post 38 is similarly pivoted to the tractor by a pin 39 and is slidably received in a guide sleeve 40. A collapsible dust protector 42 is preferably connected between the upper end of the post 38 and the sleeve 40. The upper end of the cylinder 32 is connected as by a line 44 with a restriction 46 therein with a pair of accumulators 48 and 49. Each of the accumulators 48 and 49 are provided with a floating piston 50 and 51, respectively, so that their upper ends may be charged with a compressible gas such as helium through fittings such as shown at 52. The lower portions of accumulators 48 and 49 and the upper chamber of cylinder 32 are charged with oil under pressure through a line 54 communicating with a pump 56 and supply reservoir 58.

A valve 60 controls flow of fluid through this line and through a return line 62, the function and operation of which will presently be described in detail. With the parts in positions illustrated in FIG. 2, the entire heavy mass, including the trailer and its draft connections, is free to oscillate to an extent which is limited by the compressible gas above the floating pistons 50 and 51. The relatively incompressible oil below the floating pistons 50 and 51 and above the piston 34 is permitted to pass through restricted orifice 46 in the line 44 and the limited size of the orifice creates a damping effect. Consequently, any relative vertical movement of the tractor and forward end of the scraper assembly, resulting from the passage of the equipment over uneven terrain, is limited by the gas in the accumulator chamber and the passage of oil through the orifice 46 which results from the movement of the piston 34 in its chamber. Thus, as the entire tractor-trailer assembly tends to bounce or oscillate as a primary mass, the scraper itself acts as a pendulum-like secondary mass, the vibrations of which are tuned to moderate the vibration of the primary mass (i.e., the entire tractor-trailer assembly).

Initial tuning of the system is accomplished by provision of the proper areas of pistons 50, 51 and 32 as well as the volume of the upper chambers of accumulators 48 and 49 and the pressure to which the accumulators are charged. For this reason, accumulator 48 is charged to a pressure which, with the particular areas of pistons 50 and 34, tunes the secondary mass to vibrate at the correct frequency when the machine is empty. Accumulator 49 is charged to a higher pressure such that the weight of the empty scraper is not sufficient to further compress the gas; therefore, the piston 51 is held in its lowermost position as shown. As the bowl 12 of the scraper is loaded, the weight on cylinder 32 increases and moves it downward, thus displacing fluid from the upper end of the cylinder through line 44 to the lower chamber of accumulator 48. This moves piston 50 upward, further compressing the gas in the accumulator and increasing the pressure in the system for support of the load. As pressure in the system reaches the precharge pressure of accumulator 49, any further increase in load on the scraper causes the fluid displaced from cylinder 32 to move piston 51 upward, thus utilizing the gas volume of the second accumulator. This automatically adjusts the frequency of vibration of the secondary mass, such that it continues to be effective in opposing or cancelling the vibrations of the tractor. Without an adjustment in the frequency of oscillation of the secondary mass for the loaded condition of the scraper the system will not be tuned and thus fail to provide the desired results.

To insure proper functioning of the device, the piston 34 should be disposed substantially centrally of its limits of travel as established by the upper end of cylinder 32 and an enlarged head 63 on post 38. In the event that oil under pressure of the piston should escape into the bottom of the cylinder, a check valve 66 is provided to permit discharge of the oil so that it will not prevent relative movement of the piston downwardly with respect to the cylinder.

The function of the valve 60 is to provide automatic positioning of the piston 34 in its cylinder, and the valve has a spool 68 normally centrally positioned as shown, to lock the proper amount of oil in the cylinder. To compensate for the difference in weight between the scraper loaded and unloaded, the spool 68 is connected as by a bellcrank 70 and link 71 with the pivot pin 39. Consequently, if the weight of the scraper is sufficient to compress the gas in the accumulator chamber to the extent that the cylinder 32 moves downwardly in appreciable amount, the valve spool 68 will move to the left to communicate additional fluid from the pump 56 to the cylinder 32. When the scraper is unloaded and permits raising of the hitch, the valve spool 68 is moved toward the right to form communication between the cyinder 32 and the drain line 62. In this manner, the piston 34 is automatically positioned substantially centrally of its limits of travel under all operating conditions.

Figure 3:
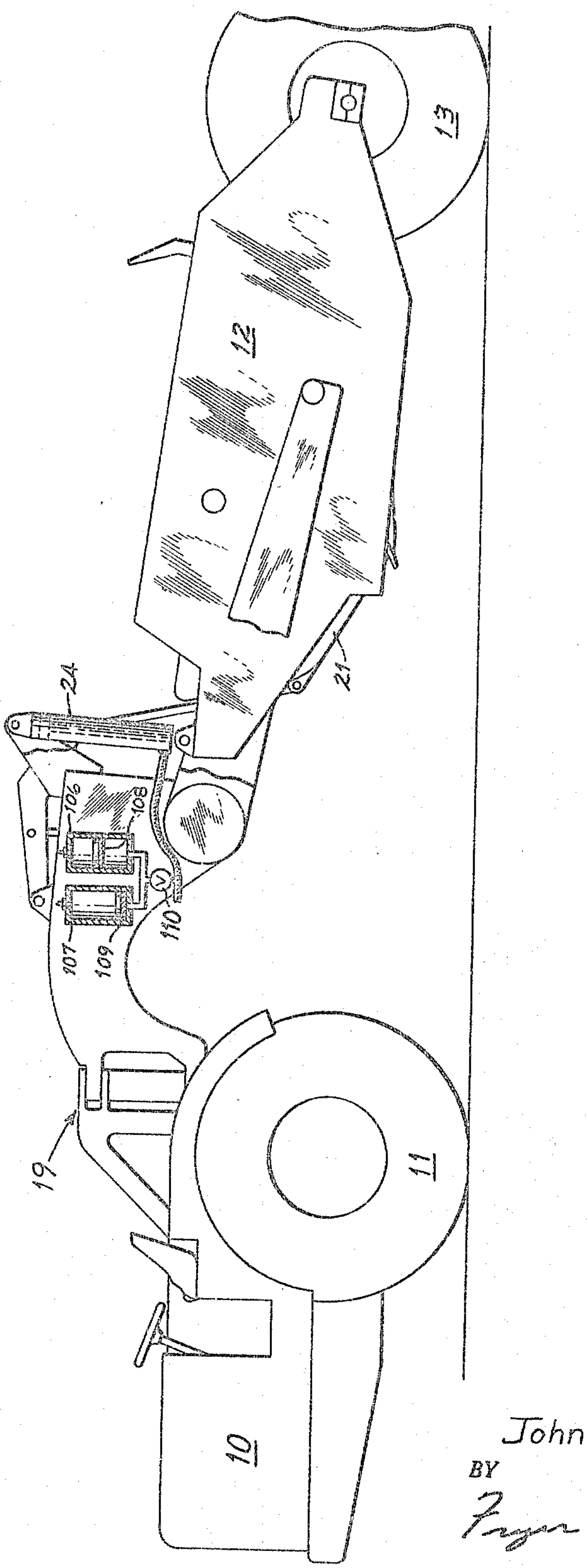
FIG. 3 is a schematic view in side elevation of a two-wheel tractor and trailer combination and illustrating the application of a modification of the present invention thereto.

A further modification of the invention is shown in FIGS. 3 and 4. This modification is particularly suitable for applying the tuned vibration principle of a secondary mass to existing tractor-scraper combinations, utilizing the weight of the scraper bowl but not of the draft connections thereon, as the secondary mass and also utilizing existing hydraulic jacks. Referring to FIGS. 3 and 4, the jacks 24 are shown as supporting the scraper bowl 12 in its raised position by fluid locked in the rod ends of the jack cylinders by means of a control valve schematically shown at 100 in FIG. 4. This is a conventional control valve disposed at the operator's station and may be manipulated to direct fluid from a pump 102 and reservoir 104 to either ends of the jacks 24 for raising and lowering the bowl. A pair of accumulators 106 and 107 with floating pistons 108 and 108 therein, respectively, are in communication with the fluid circuit between the rod ends of the jacks and the valve 100, and this communication is controlled by a valve 110 which may be actuated manually or automatically in response to movement of the bowl in a downward direction. With this arrangement, the bowl is free to oscillate, and spring means, which may be tuned, is provided by compressible gas in the accumulator chamber. The valve 110 may be closed when the bowl is lowered to its loading position, in which the operation of the scraper is relatively slow and not conducive to violent bouncing action.

What is claimed is:

1. The method of operating a tractor-trailer combination of the type wherein the trailer is supported by two wheels adjacent its rear end and by the tractor at its forward end, which comprises effecting a cancellation of the major portion of the vertical motion or bounce imparted to the tractor-trailer combination during the passage thereof over uneven terrain, said cancellation being effected by utilizing pneumatic forces in opposition to relative vertical movement of the tractor unit and the trailer unit to tune the oscillation of the trailer unit automatically to a frequency varying from (a) the frequency of oscillation when said combination passes over such terrain while said trailer unit is empty to (b) a frequency, in relation to the natural frequency of said bouncing motion, such as will generate out-of-phase forces tending to suppress the bouncing motion of the tractor unit when said tractor-trailer combination passes over such terrain while said trailer unit is loaded.

2. The method of operating a tractor-trailer combination of the type wherein the trailer is supported by two wheels adjacent its rear end and by the tractor at its forward end, which comprises effecting a cancellation of the major portion of the vertical oscillating motion or bounce imparted to the tractor-trailer combination during the passage thereof over uneven terrain, said cancellation being effected by utilizing pneumatic forces in opposition to the relative vertical movement of the tractor unit and the trailer unit to constrain the oscillation of the trailer unit automatically to a frequency varying from (a) the frequency of oscillation when said combination passes over such terrain while said trailer unit is empty to (b) a frequency which is in out-of-phase relation to the natural frequency of the bouncing motion of the tractor unit, whereby to suppress the bouncing motion of the tractor-trailer combination when passing over such terrain while the trailer unit of the combination is loaded.

3. In combination with a tractor-trailer unit wherein the trailer is supported adjacent its rear end by wheels and adjacent its forward end by a hitch assembly with the tractor, means for controlling vertical bounce of the tractor which comprises a resilient connection permitting relative vertical movement between the hitch assembly and the tractor, and means tuning said resilient connection to generate out-of-phase forces tending to suppress said bounce of said tractor.

4. In combination with a tractor-trailer unit wherein the trailer is supported adjacent its rear end by wheels and adjacent its forward end by a hitch assembly with the tractor, means for controlling vertical bounce of the tractor which comprises a resilient connection permitting relative vertical movement between the hitch assembly and the tractor, means including a confined body of compressible fluid for controlling said movement, and means to vary the volume of said fluid for tuning the natural frequency of said movement, said last-named means being operable to generate out-of-phase forces tending to suppress said bounce of said tractor.

5. In combination with a tractor-trailer unit wherein the trailer is supported adjacent its rear end by wheels and adjacent its forward end by a hitch assembly with the tractor, means for controlling vertical bounce of the tractor which comprises flexible linkage permitting relative vertical movement between the tractor and hitch assembly, an extensible connection between the hitch assembly and tractor, and means in said connection for damping and tuning said vertical movement, said tuning means being operable to generate out-of-phase forces tending to suppress said bounce of said tractor.

6. In combination with a tractor-trailer unit wherein the trailer is supported adjacent its rear end by wheels and adjacent its forward end by a hitch assembly with the tractor, means for controlling vertical bounce of the tractor which comprises an extensible jack containing hydraulic fluid connected between the tractor and trailer unit, two gas-type accumulators both communicating with the interior of said jack, said accumulators being operable to limit vertical movement of the forward end of the trailer, and means to vary the pressure of gas in said accumulators selectively, whereby one of said accumulators tunes the natural frequency of said movement when the trailer is empty and the other of said accumulators tunes the frequency of said movement when the trailer is loaded.

7. In a tractor-trailer unit wherein the trailer is supported adjacent its rear end by wheels and adjacent its forward end by a hitch assembly with the tractor, the combination comprising; resilient means between the tractor and trailer enabling the trailer to oscillate about its rear end independently of the tractor; and means tuning said resilient means to establish oscillations of the trailer which are at approximately the same frequency as the oscillations of the tractor when the tractor encounters uneven terrain, whereby out-of-phase forces are automatically established in the trailer to counteract the oscillatory forces of the tractor and thereby suppress bouncing of the combination.

8. The tractor-trailer unit of claim 7 wherein said resilient means is located between the tractor and the hitch assembly, whereby the hitch assembly oscillates with the trailer and assists in suppressing bounce.

9. The tractor-trailer unit of claim 8 wherein said resilient means comprises; a piston on a rod slidably disposed in a first chamber forming a part of the connection between the tractor and trailer; a second chamber in communication with said first chamber; a floating piston slidably disposed in said second chamber; a quantity of incompressible fluid between one side of said floating piston and the piston on a rod; and a quantity of compressible fluid in said second chamber on the other side of said floating piston, wherein the size of the pistons and quantity of compressible fluid are selected to cause the trailer to oscillate at a particular frequency.

10. The tractor-trailer unit of claim 9 further comprising; a third chamber communicating with said first chamber; a floating piston slidably disposed in said third chamber; a quantity of incompressible fluid between one side of said floating piston and said piston on a rod; and a quantity of compressible fluid in said third chamber on the other side of said floating piston, wherein the pressure of the compressible fluid in said third chamber is greater than the pressure of the compressible fluid in said second chamber, whereby the trailer automatically oscillates at one selected frequency when it is empty and a different frequency when it is loaded.

11. The tractor-trailer unit of claim 9 further comprising; hydraulic fluid supply means operatively connected to said first chamber and operative to maintain a quantity of incompressible fluid between said chambers sufficient to dispose said piston on a rod at the approximate mid-portion of said first chamber, under static conditions.

References Cited by the Examiner

UNITED STATES PATENTS

| | | | |
|---|---|---|---|
| 989,958 | 4/1911 | Frahm | 188—1 |
| 2,460,725 | 2/1949 | Armington | 280—489 |
| 3,014,739 | 12/1961 | Kress | 280—489 |
| 3,077,345 | 2/1963 | Andersson et al. | 267—64 |
| 3,135,529 | 6/1964 | Conrad | 280—489 |

LEO FRIAGLIA, *Primary Examiner.*